June 19, 1934.  J. H. MILLER  1,963,208
TUBE TESTING APPARATUS
Filed Aug. 30, 1932   2 Sheets-Sheet 1
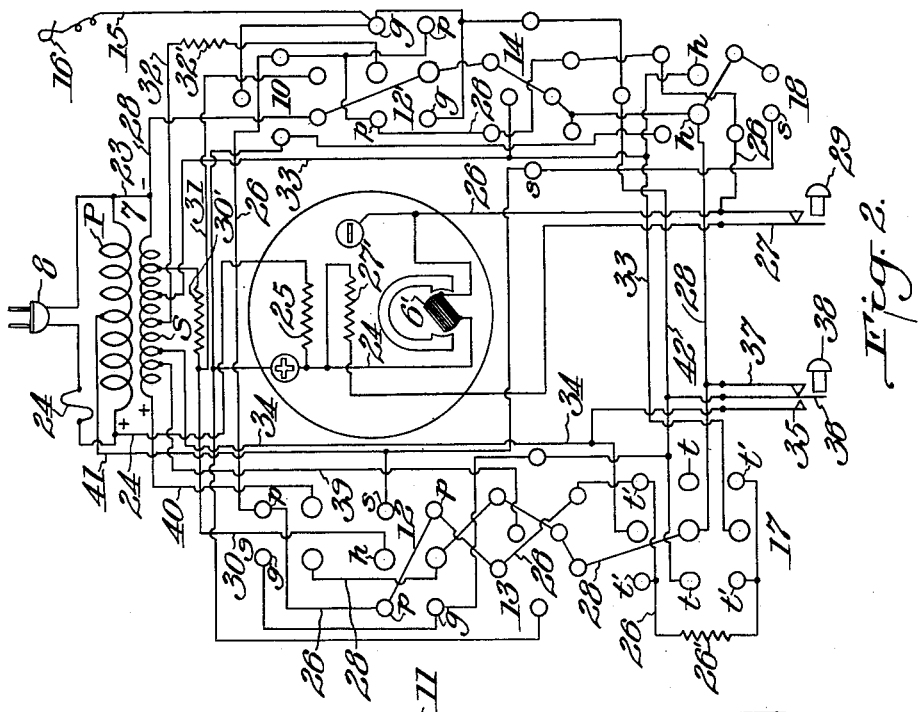
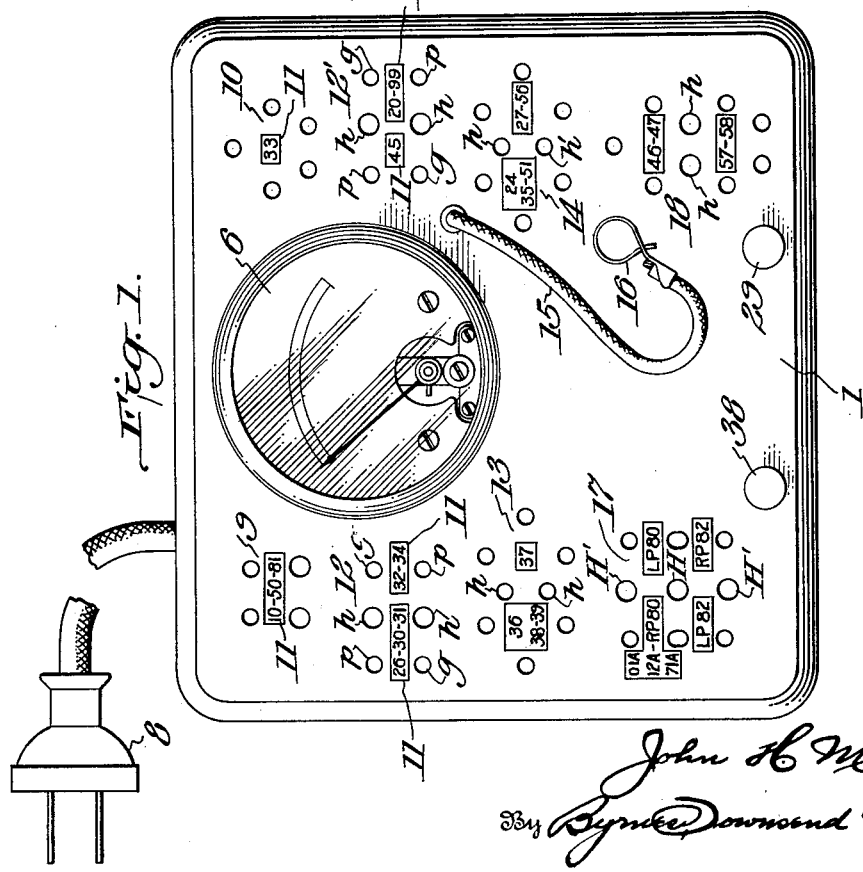
Inventor:
John H. Miller,
By Bynes Townsend & Potter,
Attorneys.

June 19, 1934.  J. H. MILLER  1,963,208
TUBE TESTING APPARATUS
Filed Aug. 30, 1932  2 Sheets-Sheet 2
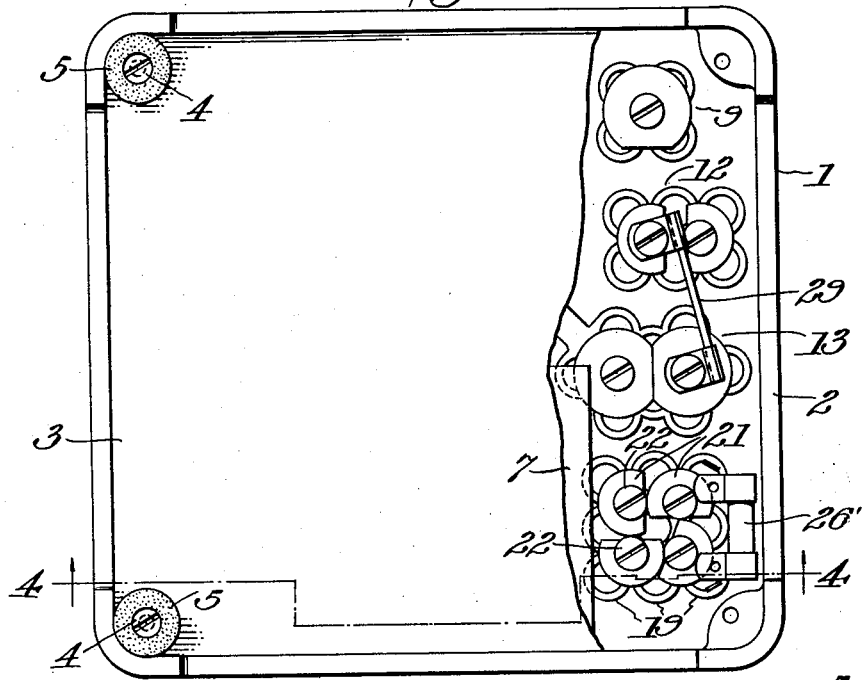
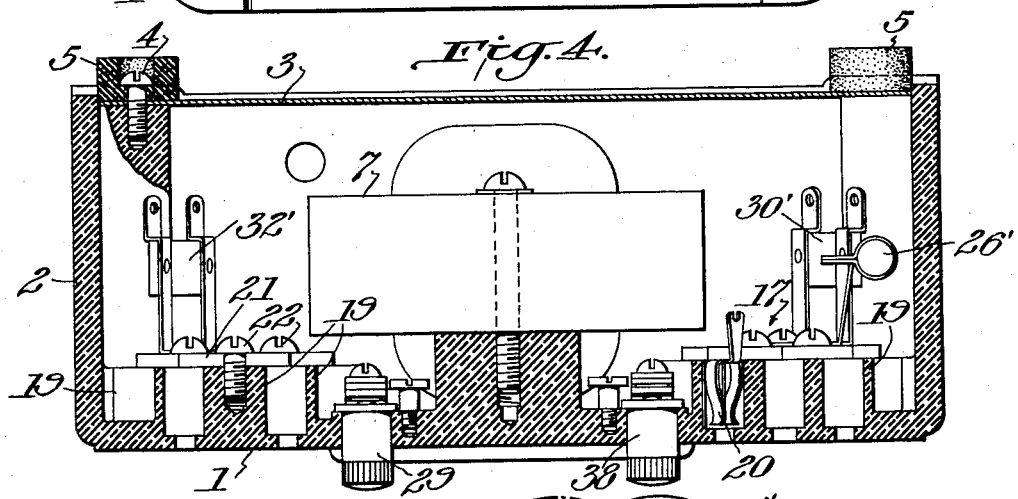
Inventor:
John H. Miller,
By Byrnes Townsend & Potter,
Attorneys Patented June 19, 1934

1,963,208

UNITED STATES PATENT OFFICE 1,963,208

TUBE TESTING APPARATUS

John H. Miller, East Orange, N. J., assignor to Weston Electrical Instrument Corporation, Newark, N. J., a corporation of New Jersey Application August 30, 1932, Serial No. 631,087

12 Claims. (Cl. 250—27)

This invention relates to tube testing apparatus, and particularly to simple and compact apparatus for checking the properties of thermionic vacuum tubes of a plurality of types.

In the known devices for checking vacuum tubes, separate sockets are provided for tubes of different electrical characteristics or with different types of terminals, or adapters are provided to permit the testing of different types of tubes in one socket. The comparatively rapid development of various types of tubes has complicated the design of tube testing apparatus. The various types of tubes now sold commercially can be tested only in apparatus which includes fourteen sockets, or six sockets and eight adapters, and it is apparent that additional types of tubes will be introduced from time to time. The cost and the size of testing sets increase with the number of sockets, and adapters are both expensive and inconvenient.

Objects of the present invention are to provide tube testing apparatus of relatively small size and which avoids the use of adapters. An object is to provide testing apparatus including one or more multiple sockets, each adapted to receive a plurality of types of tubes and to establish the appropriate energizing potentials upon the elements of each of the tubes which may be inserted in the socket. A further object is to provide tube testing apparatus including one or more multiple sockets for alternatively receiving tubes of different terminal design, each multiple socket including a plurality of contacts so positioned that one or more of the contacts are employed with all types of terminal design and other contacts are individual to the several terminal designs.

More specifically, an object is to provide a tube tester of the alternating current type, and including a transformer, a measuring instrument, a plurality of multiple sockets of the type stated above, and circuit connections between the transformer and the several contacts of each socket for providing the appropriate energizing potentials for testing tubes of a greater number of designs than there are sockets.

These and other objects and advantages of the invention will be apparent from the following specification when taken with the accompanying drawings, in which:

Fig. 1 is a plan view of one form of tube testing apparatus embodying the invention, Fig. 2 is a wiring diagram of the apparatus shown in Fig. 1, Fig. 3 is a bottom view, with parts broken away, of the testing apparatus, Fig. 4 is a sectional view on line 4—4 of Fig. 3, and Figs. 5 and 6 are diagrammatic views illustrating the method of making different tube tests with a single multiple socket.

In the drawings, the reference numeral 1 identifies the top panel of a casing having side walls 2, the panel and walls preferably being integral and formed of a molded synthetic resin. The bottom wall 3 is a flat metal plate that is held to the casing by screws 4 that also attach soft rubber feet or supports 5 to the lower face of the casing.

A measuring instrument 6 is mounted on the panel 1 for indicating the flow of thermionic current established when a tube is under test. The tubes may be energized from any appropriate current source, but preferably the apparatus includes a transformer 7 having a primary winding P that may be connected to the usual alternating current light and power line by a plug connector 8, and a tapped secondary winding S.

A plurality of tube sockets are carried by, or preferably, and as shown, are formed as a part of, the panel 1. From the face of the panel 1, these sockets appear as groups of apertures for receiving the terminals of a tube, and certain of these groups of apertures or sockets may be of the known type in which the apertures of each group are so spaced as to receive tube terminals of one particular design. Sockets of this type are shown at the top of Fig. 1, being identified by the reference characters 9, 10. A legend 11 is located within each group of apertures to indicate the type of tube which is to be tested in that particular socket.

In accordance with the invention, a plurality of tube sockets are of multiple or composite design, and each multiple socket is adapted to receive, alternatively, tubes of at least two different types so far as concerns the geometry of the tube terminals. In the construction of the multiple sockets, advantage is taken of the fact that but one tube is to be tested at any time, and that the same energizing potentials are to be applied to one or to two of the terminals of several tubes of varying terminal design. By an appropriate angular arrangement of the socket openings or contacts about the contact or pair of contacts which may be considered as common to a plurality of types of tubes, a multiple socket may be provided which occupies materially less space than that required for separate sockets for each of the several types of tubes. In general, the same filament or cathode heater voltages are used with a plurality of tubes and the multiple sockets included in the illustrated apparatus are designed to receive tubes of different electrical characteristics or terminal design but which have the same or approximately the same filament or cathode heater terminal arrangement.

Two multiple sockets or groups of openings for receiving directly heated tubes of the four prong type are indicated, generically, by reference numerals 12, 12'. Each group consists of a pair of openings $h$ for receiving the filament or cathode heater terminals and, at each side of these openings, a pair of openings $g, p$, or $s, p$, for receiving the grid and plate terminals of triodes or the screen grid and plate terminals of tetrode tubes. As with the single sockets, 9, 10, appropriate legends 11 are provided to indicate the type of tube which may be tested in the individual sockets of this set of multiple sockets.

Similarly, a double socket 13 is provided for receiving different types of indirectly heated triodes by arranging sets of plate, grid and cathode openings at opposite sides of the common heater openings $h$. The same grouping of socket openings is employed in the multiple socket 14 and, in addition, a flexible lead 15 having a spring terminal 16 is provided for connection to the control grid terminal of a type 24 tube.

The multiple socket 17 includes three alined openings, H, H', for receiving the cathode heater or filament terminals of certain types of triodes and/or full wave rectifiers. Two alined rows of three openings, $t, t'$ (see Figs. 5 and 6) are arranged at each side of the cathode heater openings, the openings $t$ being of oval shape to permit some variation in the spacing of tube terminals.

The other multiple socket 18 which is shown in Fig. 1, includes three openings grouped at one side of the common openings $h$ to receive tubes having five prongs and four openings at the opposite side to receive tubes having six prongs.

As shown in Figs. 3 and 4, ribs 19 project from the lower face of panel 1 to form seats in alinement with the socket openings, and spring contacts 20 are retained in the seats by insulating disks 21 which are held to the panel 1 by screws 22.

The electrical connections for the testing apparatus are shown in Fig. 2, in which the circles or ovals corresponding to socket openings in the panel 1 are shown in the same relative arrangement as that of the several socket openings in Fig. 1. In general, the circuit arrangement conforms to that of known testing apparatus in which separate sockets are provided for each type of tube, and is so designed that the potentials impressed upon the various contacts are those appropriate for the testing of any tube which is placed in the particular socket indicated for that type of tube by the legends 11.

As indicated by the polarity signs +, —, the terminals of the transformer windings which are joined by the jumper 23 are negative during half-cycles when the plate polarity of a tube under test is positive with respect to the tube cathode, and the opposite terminals of the transformer windings are at positive potentials.

A fuse 24 is preferably included in the primary circuit to protect the apparatus against damage. The other terminal of the primary winding P is connected by a lead 24 and a ballast resistance 25 to the measuring instrument winding 6', the resistance 25 preventing excessive current flow in the case of abnormal tubes. The opposite side of the winding 6' is connected by a lead 26 to one terminal of a normally closed switch 27 which shunts a resistance 27' across the winding. Upon opening the switch by depressing the button 29, the shunt circuit is broken and the measuring instrument is thereby rendered more sensitive. From the switch 27, the lead 26 extends to the plate contacts of the several sockets, and the circuit may be traced in counter-clockwise fashion through the several sockets, and to the upper set of contacts $t'$ of the socket 17. A resistance 26' is there inserted in the portion of the lead 26 which extends between the upper and lower sets of contacts $t'$.

One of the cathode heater contacts of each socket and the cathode contacts of sockets for indirectly heated tubes are connected to the joined terminals of the transformer winding by a lead 28 which may be traced clockwise from the transformer past the several sockets. The other cathode heater terminal of each socket is connected to one of the taps on the secondary winding.

The first tap of the secondary has a potential of about 2 volts with respect to the negative terminal of the secondary and is connected, through a resistance 30', of about 0.45 ohms, and a lead 30 to the second contact $h$ of the socket 12, and through resistance 30' and a lead 31 to a heater contact of socket 10. As will be described hereinafter, the resistance 30' provides a voltage drop which permits the testing of tubes of different rated filament voltages in the same socket. Similarly, the lead 32 from the third or 3.3 volt transformer tap to the second cathode heater contact $h$ of the socket 12' includes a resistance 32' which is also of about 0.45 ohms.

The second or 2.5 volt tap on the secondary winding S is connected by a lead 33 to a cathode heater terminal of the sockets 14 and 18 and to the lower contact H' of the socket 17. From the fourth or 5 volt tap, a lead 34 extends to the upper contact H' of socket 17, and also to the back contact 35 of a single pole, double throw switch having a movable blade 36 which normally engages a contact 37 that is connected to the lead 28, i. e., to the joined terminals of the transformer windings. Actuation of this switch by pressing the button 38 changes the bias voltage on the control grid contacts, and the resulting change in plate current affords an indication of the characteristics of the tube.

A lead 39 extends from the next or 6.3 volt tap of winding S to the heater contact $h$ of socket 13, and a lead 40 connects the end or 7.5 volt tap of the winding to a cathode heater terminal of the socket 9.

A consideration of the tube designations given by the labels 11 will show that, except for sockets 12 and 12', the voltage developed between the jumper 23 terminal of winding S and the tap to a particular socket is the rated voltage for the filamentary cathode or the cathode heater of the types of tubes which are to be tested in that socket. As shown by the legend 11, the socket 12 is adapted to receive tubes of the commercial types 26, 30, 31, 32 and 34. The filament of a type 26 tube draws 1 ampere at 1.5 volts while the other tubes of this group draw about 60 milliamperes at 2 volts. By including the series resistance 30', of 0.45 ohms, in a filament circuit connected across a secondary section that develops a trifle over 2 volts, there is only a slight voltage drop across the resistance when a low current tube is inserted in the socket, but the voltage drop developed when one ampere flows in the circuit reduces the voltage across the filament contacts $h$, $h$, to about 1.5 volts, thus providing the proper filament voltage for type 26 tubes. In the same way, the socket 12' may receive type 45 tubes which draw 1.5 amperes at 2.5 volts, and types 20 and 99 tubes which draw about 0.13 and 0.06 amperes, respectively, at 3.3 volts, as the resistance 32' cuts down the transformer voltage of a little over 3.3 volts to about 2.5 volts on the heavy current tube. The advantages obtained by the use of the resistances are obvious, since they avoid the use of two sockets and two additional taps on the secondary S.

The screen grid contacts $s$ of the sockets 12', 14 and 18 are connected to an intermediate point on the primary winding P by a lead 41. The potentials on these grids will therefore be positive when the plate potentials are positive.

As noted above, the merit of tubes having control grids is determined by comparing the plate current flow established by two different grid bias voltages. The control grid contacts of the tube sockets are connected by a lead 42 to the movable switch contact 36. With the button 38 raised, the control grid contacts are connected to that terminal of the secondary winding S which establishes the negative potential on the cathode of indirectly heated filaments, or on the negative terminal of filamentary cathodes, when the plate potential is positive. On depressing the button 38, the grid bias potential is shifted to 5 volts positive, and the change in plate current for this change in control grid bias gives an indication of the value of a tube.

Reverting to the socket 17, the legends 11 indicate that different types of tubes may be inserted in the groups of four openings which are arranged as quadrants of the complete set of openings. The triode tubes of tubes 01A, 12A and 71A may be inserted in the upper left quadrant and, upon insertion of one of these tubes, the described connections will provide a 5 volt drop across the filament i. e., between the contact H and the upper contact H', the full positive plate voltage on the upper left contact $t'$, and either a negative bias voltage of about 2.5 volts or a positive bias of 5 volts on the left contact $t$, depending upon the position of the switch button 38. The phase of these voltages will, of course, reverse for each half-cycle, but the phases are as above stated during half-cycles in which the tube is operative. As indicated by the legends, each plate of a full wave rectifier of the 80 and 82 types may be tested in this socket and, in testing the action of the right and of the left plates of such tubes, the tube may be considered as comprising two tubes of different types since it is inserted in different positions in the multiple socket.

As shown in Fig. 5, and as indicated by the two legends "LP 82" and "RP 82", the tests of the left and the right plates of a mercury vapor rectifier tube of the 82 type are made by inserting the tube terminals in the four openings constituting, respectively, the lower left and the lower right quadrants of the nine openings of the socket 17. The plate voltage to both of the lower contacts $t'$ is supplied through the ballast resistor 26', see Fig. 2, of about 600 ohms, which limits the current flow for tubes of this low internal resistance type. In testing the left plate, the right plate terminal engages the left contact $t$, but the voltage on this contact is negative and substantially that of the filament, thereby causing no current flow to the right plate. The location of the tube base for this test is shown in broken line 44 in Fig. 5. In testing the right plate, the tube base occupies the position shown by the full line 45, and the terminal of the left plate enters the right opening $t$, which does not contain a contact.

In testing full wave rectifier tubes of the type 80, the high vacuum of such tubes provides a high internal resistance which renders a ballast resistance unnecessary, and therefore these tubes may be tested in the upper openings of the socket 17. In testing the right plate, the tube base occupies the position shown by the full line 46 of Fig. 6, and, by rotating the tube through 180°, the left plate may be tested by inserting the tube terminals in the upper left quadrant, the base then occupying the position indicated by the broken line 47. In either case, the maximum plate voltage is applied to the tube.

An examination of the series of tube types indicated by the legends 11 will demonstrate the advantages of the invention. In the particular embodiment shown in the drawings, thirty-two types of tubes may be tested by insertion in the appropriate one of but eight sockets. The grouping of terminal openings or contacts about those contacts which may be common to different types of tubes reduces the size of the panel and the number of contacts required, and the grouping of tubes of different cathode heater voltages for test in a socket in which the cathode heater circuit is fed through a series resistance effects a further reduction in the number of sockets, contacts and cathode heater voltages.

It will be apparent that other groupings of tubes for test in a multiple socket may be employed, and that, with the development of tubes of novel electrical characteristics and/or novel terminal design, other groupings may be more desirable. While the combining of sockets on the basis of common filament or cathode heater terminals has been illustrated, it is obvious that the multiple sockets contemplated by this invention may be provided by employing, as the common contact or contacts of several sets of socket contacts, any other tube terminal connections which meet the electrical and physical requirements of the circuit.

I claim:

1. In apparatus for testing thermionic tubes, the combination with an electrical network for connection to a source of current and having a plurality of terminals at which different voltages are established by said source, of a measuring instrument, a multiple tube socket having a plurality of sets of contacts for receiving the terminals of tubes of different types and at least one contact being common to two of said sets, and circuit connections extending from said network to said instrument and said contacts.

2. In apparatus for testing thermionic tubes, the combination with a transformer having a tapped secondary and a primary adapted to be connected to an alternating current source, of a measuring instrument, a multiple tube socket having a plurality of sets of contacts for receiving tube terminals, at least one contact being common to two of said sets and the contacts of each set being spaced about said common contact to permit the alternative introduction of the terminals of different types of tubes into said socket, and circuit connections from said transformer to said contacts and said instrument to complete circuit for energizing a tube when inserted in said socket.

3. In testing apparatus for receiving different types of tubes which have approximately the same arrangement of cathode heater terminals, a multiple socket comprising a pair of cathode heater contacts, and a plurality of sets of contacts grouped about said pair of contacts, each set of contacts cooperating with said pair of contacts to constitute a socket for the reception of one type of tube, means for energizing said contacts from a source of current, and a measuring instrument for indicating the flow of current established when a tube is inserted in one socket of said multiple socket.

4. The invention as set forth in claim 3, wherein said sets of contacts are arranged at opposite sides of a line joining said pair of contacts.

5. In tube testing apparatus, the combination with a multiple socket comprising a row of three alined contacts, each of the two outer contacts cooperating with the center contact to form pairs of contacts for receiving the tube terminals of a cathode heater circuit, and a line of alined contacts at each side of said row of contacts and cooperating therewith to form sockets for the reception of a plurality of types of tubes, of an electrical network for connecting the several contacts to a source of current, and a measuring instrument for indicating the current flow established when a tube is inserted in one of the sockets of said multiple socket.

6. The invention as set forth in claim 5, wherein the outer contacts of each of said lines of contacts are adapted to receive the plate terminals of tubes, and said network includes a connection for joining all of said plate contacts to each other and to the said source, in combination with a ballast resistance between certain only of said plate contacts and said source.

7. In apparatus for testing thermionic tubes, a casing, a measuring instrument carried by the panel of said casing, a plurality of sets of apertures in said panel for receiving the terminals of tubes of different types, at least one of said apertures being common to all of said sets of apertures, contacts carried by and back of said panel for engagement by tube terminals, a pair of terminals for connection to a source of current, and circuit connections from said pair of terminals to said instrument and said contacts.

8. In testing apparatus, the combination with a panel having socket openings therein for receiving tube terminals, contacts carried by said panel beneath the socket openings, circuit elements for connecting the contacts to a source of current, a measuring instrument, said socket openings and contacts being grouped in at least two sets having at least one opening and contact in common, and each set being adapted to receive terminals of a tube.

9. A tube tester of the type including a transformer having a primary adapted to be connected to an alternating current source and a tapped secondary, a socket having contacts for engagement with tube terminals, a measuring instrument, and circuit connections from said transformer windings to said socket contacts and instrument, characterized by the fact that said contacts include two overlapping sets of contacts having at least one contact in common, each set of contacts being positioned to receive the terminals of a tube, and the circuit connections to the respective sets establishing on the contacts thereof potentials appropriate for energizing tubes of two different types.

10. The invention as set forth in claim 9, wherein the two sets of contacts are positioned to receive tubes of different electrical characteristics but having the same terminal construction.

11. In apparatus for testing tubes of two different types having cathode heaters which draw, respectively, different currents at different voltages, the combination with a socket for receiving a tube of either type, said socket including a pair of contacts for engaging the heater terminals of either type of tube, a measuring instrument, terminals adapted to be connected to a source of current, and a network across said terminals and including different voltage taps, of circuit elements including a relatively fixed series resistance connecting the cathode heater contacts of said socket to voltage taps on said network across which the voltage is in excess of the highest rated cathode heater voltage of any of said types of tubes, the resistance having a magnitude for which the voltage drop established by the rated current flow of any one type of tube reduces the voltage across the cathode heater of that type of tube to its rated value for that tube.

12. In apparatus for testing thermionic tubes of two different types, one type of tube having a cathode heating circuit which draws more current and at a lower voltage than a tube of the other type, a socket for receiving tubes of either type, circuit connections including a fixed series resistance between the cathode heater contacts of said socket and source of current having a voltage in excess of the rated voltage of the cathode heaters of tubes of the second type, a measuring instrument, and circuit connections for energizing the other contacts of said socket from said source of current, the fixed series resistance having a magnitude which provides a voltage drop across the same to reduce the voltage across the cathode heaters of both types of tubes to their respective rated values.

JOHN H. MILLER.